Nov. 10, 1970 — E. PLUMAT ET AL — 3,539,320
METHOD AND APPARATUS FOR MANUFACTURING FLOAT
GLASS OF REDUCED THICKNESS
Filed Dec. 20, 1966 — 4 Sheets-Sheet 1

INVENTORS:
Emile Plumat
Marcel Delzant

BY Spencer & Kaye
ATTORNEYS

INVENTORS:
Emile Plumat
Marcel Delzant

BY Spencer & Kaye
ATTORNEYS

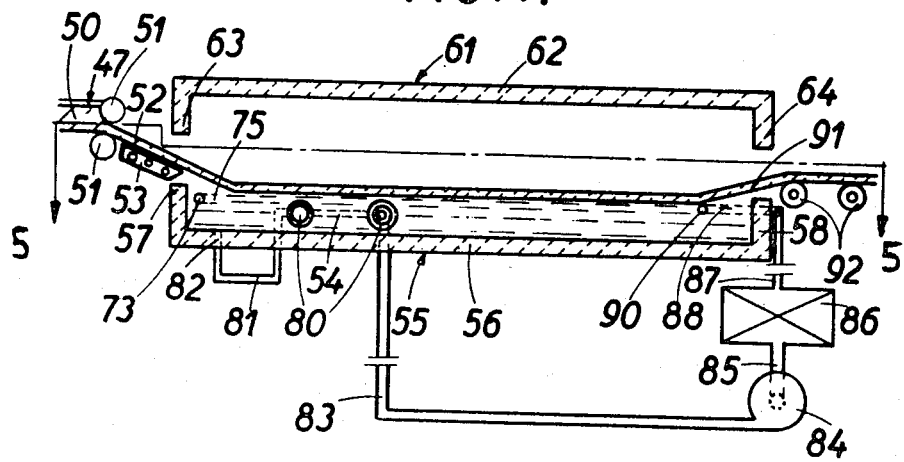
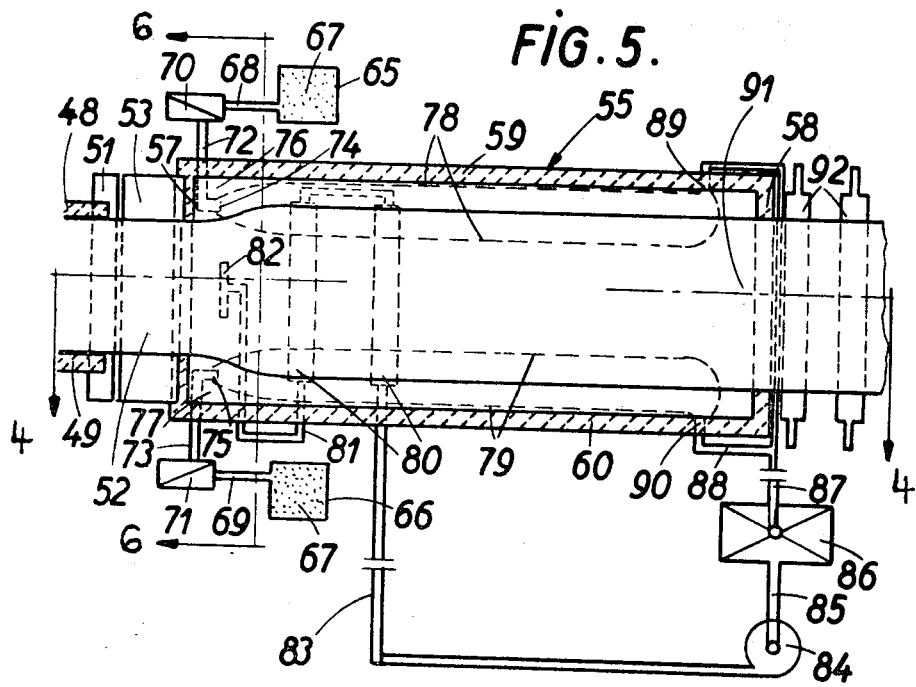

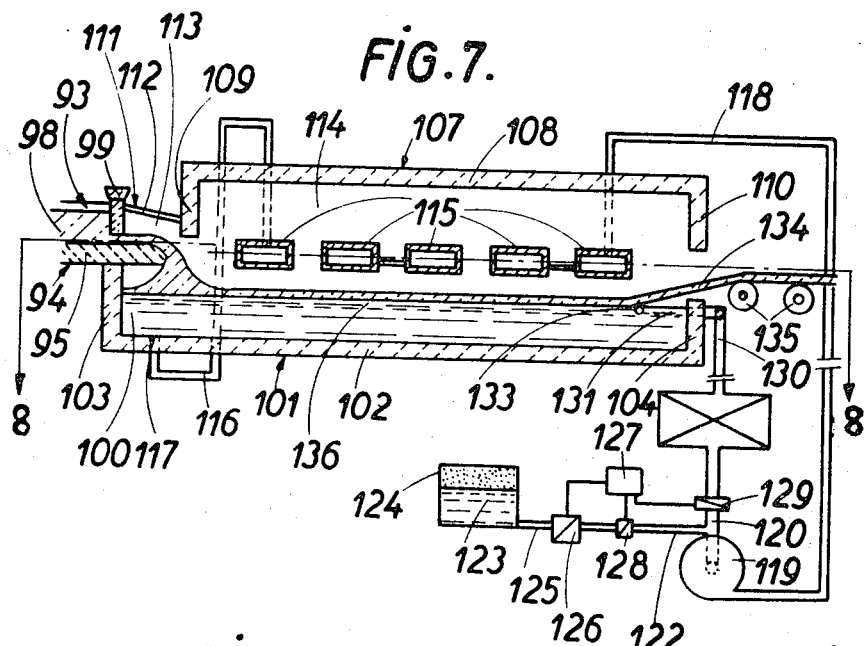
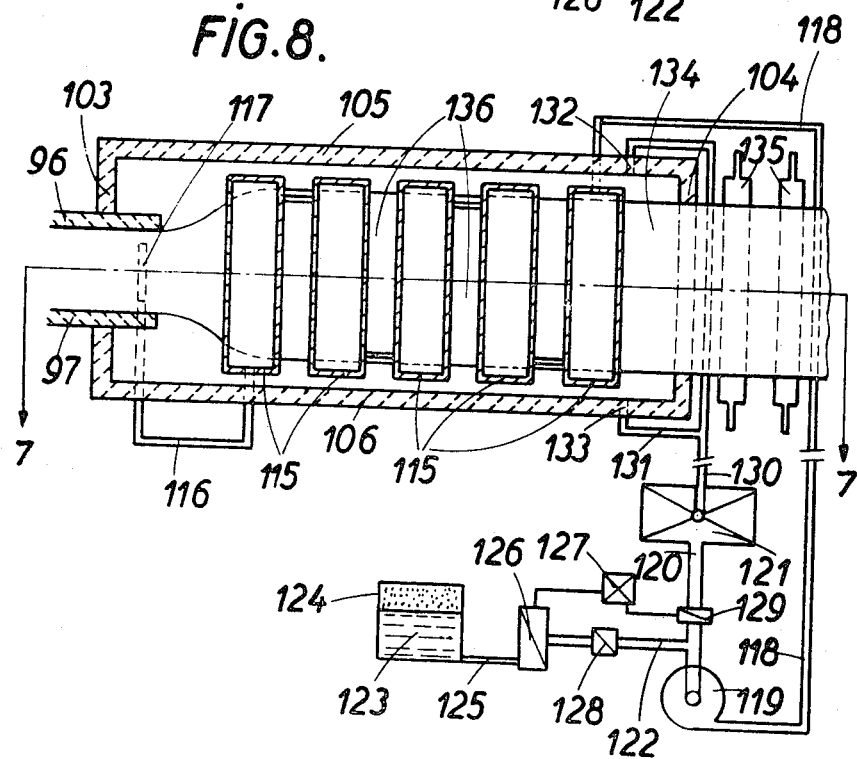

United States Patent Office 3,539,320
Patented Nov. 10, 1970

3,539,320
METHOD AND APPARATUS FOR MANUFACTURING FLOAT GLASS OF REDUCED THICKNESS
Emile Plumat, Gilly, and Marcel Delzant, Mont-sur-Marchienne, Belgium, assignors to Glaverbel S.A., Brussels, Belgium
Filed Dec. 20, 1966, Ser. No. 603,357
Claims priority, application Luxembourg, Jan. 11, 1966, 50,237
Int. Cl. C03b *18/02*
U.S. Cl. 65—99     14 Claims

ABSTRACT OF THE DISCLOSURE

Thin flat glass (less than 5 mm. in thickness) is mass produced by pouring molten glass onto a molten metal bath and dissolving a surface tension reducing agent selected from the group consisting of sulphur and tellurium in the molten metal bath under the edges of the glass layer to reduce the equilibrium thickness of the glass layer below 5 mm.

BACKGROUND OF THE INVENTION

This invention relates to the manufacture of flat glass by the float-glass process. In the float-glass process, molten or plastic glass is poured onto a bath of molten metal, and the glass spreads out until the glass layer reaches a well-defined thickness which is conventionally known as the equilibrium thickness. The equilibrium thickness in any given process depends on a number of different factors, including the compositions of the glass and bath. When using a bath of molten tin, the equilibrium thickness is generally about 5.8 mm.

In order to form flat glass having a thickness appreciably less than 5.8 mm. on a bath of molten tin, the practice has hitherto been to draw out the ribbon of floating glass after it has reached its equilibrium thickness.

When using a molten metal bath containing a metal other than tin, different thicknesses of flat glass may be obtained, again depending to some extent on the composition of the glass itself, but in any case it has not hitherto been thought possible to form flat glass with a thickness as small as 5 mm. without drawing or stretching the glass layer.

Unfortunately, stretching the glass has disadvantages which offset some of the advantages of the float-glass process. In particular, the stretching process considerably narrows the ribbon of floating glass. In addition, any local heterogeneities in the glass layer become distributed so as to affect a greater length of the glass ribbon.

SUMMARY OF THE INVENTION

The principal object of this invention is to provide a method and apparatus for manufacturing thin flat glass by the float-glass process without stretching the glass, thereby eliminating the above-noted disadvantages. In accordance with this invention, a new method has been devised in which flat glass less than 5 mm. in thickness can be formed by the float process without stretching the floating glass layer.

According to the method of this invention, molten or plastic glass is poured onto a bath of molten metal and allowed to spread out to reach equilibrium thickness, and a surface tension reducing agent is applied to the molten metal bath underlying the edges of the floating glass layer to reduce the surface tension of the molten metal bath in a direction to reduce the wetting angle of the glass on the metal bath so that the equilibrium thickness of the glass layer is less than it would be in the absence of the surface tension reducing agent.

As will be described in detail below, the addition of an appropriate element in quite small quantities suffices to lower the surface tension of the molten metal bath in the regions underlying the edges of the glass layer. This lowering of the surface tension produces a decrease in the wetting angle of the glass on the molten metal bath and consequently reduces the equilibrium thickness of the glass layer. The extent to which the surface tension must be reduced depends upon the extent to which the equilibrium thickness must be reduced below the value which would normally obtain in the given process, but the main object of the invention is to substantially reduce the equilibrium thickness, and particularly importance is attached to embodiments of the invention in which such a substantial reduction is obtained. In particular, preference is given to embodiments in which the equilibrium thickness of the glass layer is less than 5 mm. or even less than 4 mm. As noted above, it was not hitherto thought possible to produce float glass below 5 mm. in thickness under these conditions without stretching. By means of the invention, however, it is quite possible to form flat glass 1.5 mm. in thickness on a molten tin bath without subjecting the glass to stretching.

The invention also includes appartaus for manufacturing glass in accordance with the method of this invention. The apparatus includes a tank for holding a bath of molten metal, means for conducting molten glass to the surface of the bath at one end of the tank, means for withdrawing formed flat glass continuously from the other end of the tank, and means for continuously applying a surface tension reducing agent into the molten metal bath at a predetermined rate so as to maintain the surface tension of the bath at a predetermined value at least in the surface regions of the bath which underlie the edges of the floating glass layer. The apparatus preferably also includes means for withdrawing molten metal from the upper region of the bath at or near the said other end of the tank and for recycling the withdrawn molten metal into the tank at or near said one end thereof, with a purifier for removing the surface tension reducing agent from the molten metal before it is re-introduced back into the tank.

BRIEF DESCRIPTION OF THE DRAWINGS

FIG. 4 is a vertical cross-sectional view of a second apparatus for forming flat glass by the float process of this invention.

FIG. 5 is a horizontal cross-sectional view taken substantially along reference line 5—5 of FIG. 4.

FIG. 7 is a vertical cross-sectional view of a third apparatus for forming flat glass by the float process of this invention.

FIG. 8 is a horizontal cross-sectional view taken substantially along reference line 8—8 of FIG. 7.

DESCRIPTION OF THE PREFERRED EMBODIMENTS

Figure 1:
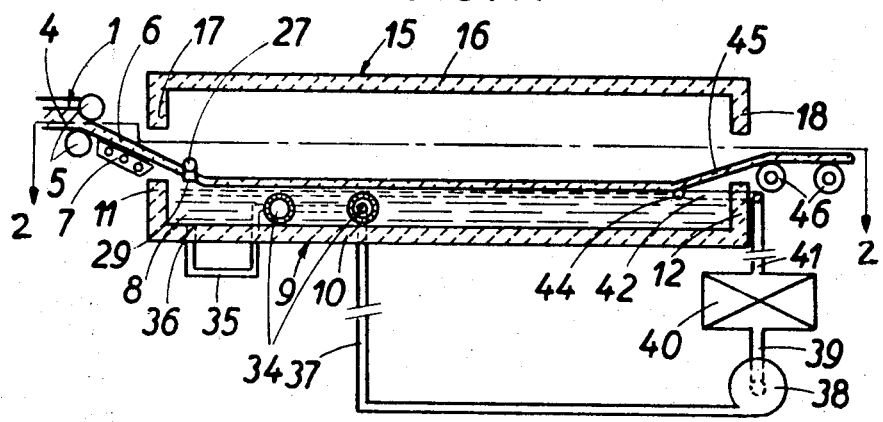
FIG. 1 is a vertical cross-sectional view of an apparatus for forming flat glass by the float process of this invention.

Before discussing the embodiments shown in the drawings in detail, the general principles of the invention will first be discussed.

The substance which is dissolved in the molten metal to reduce the surface tension thereof may be an element or compound. It is preferable for this substance to be a compound of the bath metal with another element, and in this case the substance may be added as such to the molten metal bath or it may be formed in situ by adding to the bath an element which combines with the bath metal under the conditions obtaining in the bath. In the following description the expression "surface tension reducing agent" is used to denote the material (whether an element or compound) which is added to the molten metal bath to bring about the reduction of surface tension, irrespective of whether the lowering of the surface tension is due to this agent as such or to a compound formed in situ in the bath by reaction between the agent and the bath metal. Where it is desired to refer essentially to a surface tension reducing agent or a compound formed therefrom, as present in dissolved state in the bath, reference is simply made to "the dissolved substance."

The surface tension reducing agent is preferably an element or combination of elements selected from the following group of elements: aluminum, antimony, arsenic, nitrogen, boron, carbon, gallium, germanium, indium, oxygen, phosphorus, lead, polonium, selenium, silicon, sulphur, tellurium, thallium. In particular, it is preferable to use an element which can be used in a molten tin bath and can easily be separated from the tin; the best example of such an element is sulphur.

In carrying out the invention, it is desirable to exercise a close control over the quantity of dissolved substances present in the molten metal at the surface of the bath which affect the equilibrium thickness of the floating glass layer. Due to the continuous movement of the glass ribbon along the surface of the bath, there is a forward surface current in the bath, and control may be achieved by continuously removing the dissolved substance from the surface region of the bath at or near the glass exit end and continuously introducing fresh surface tension reducing agent into the surface portion of the bath at or nearer the glass feed end in the appropriate amount for maintaining the surface tension at the required value at least in the surface regions of the bath underlying the margins of the floating glass layer.

The surface tension reducing agent may be brought into contact with the molten metal bath at or near its surface, e.g., through passages opening above or just below the surface of the bath. It is sufficient to apply the surface tension reducing agent to the bath at or near the glass feed end adjacent the two side boundaries of the bath. Due to the forward current of the bath, the dissolved substance will be carried towards the glass exit end of the bath. If separate quantities of the agent are applied to the side margins of the bath at its surface region, the dissolved substance will naturally spread inwardly towards the central region to some extent, but separate zones with reduced surface tension may persist along the whole length of the bath up to the point at which the molten metal containing the dissolved substance is withdrawn for purification.

It is not necessary, of course, to introduce the surface tension reducing agent at or near the surface of the bath. The surface tension reducing agent can be introduced, for example, at the bottom of the bath at or near the glass feed end, in which case the dissolved substance tends nevertheless to be drawn upwards into the surface current. Moreover, the surface tension reducing agent may be fed into the stream of molten metal flowing back from the purifier to the tank, so as to enter the tank along with the molten metal.

The system for feeding the surface tension reducing agent into the tank is preferably constructed so that the rate of such feed can be adjusted. The thickness of the flat glass formed on the bath of molten metal can then be easily changed from one value to another in the course of the flat glass production.

Figure 2:
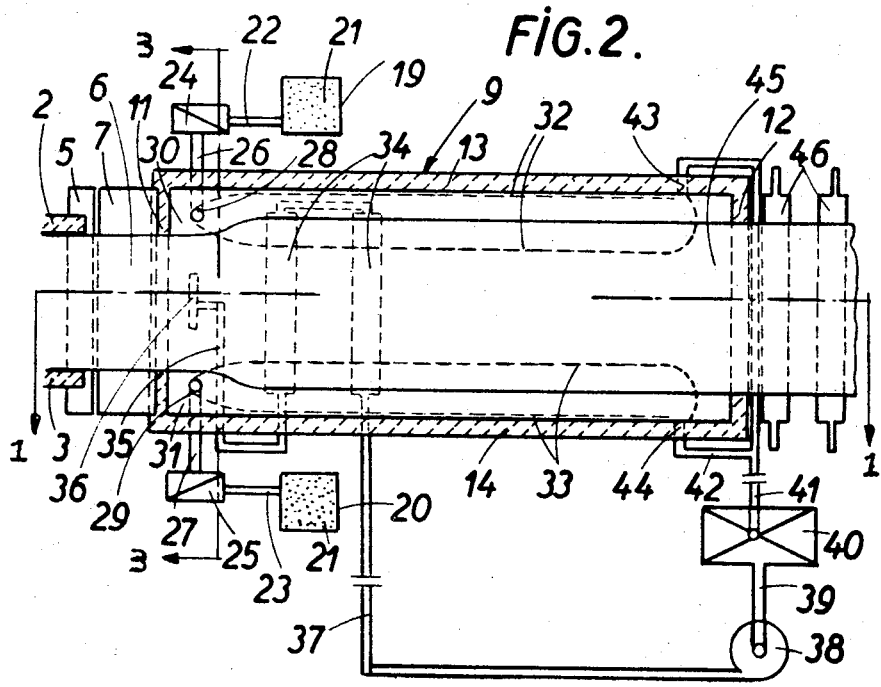
FIG. 2 is a horizontal cross-sectional view taken substantially along the plane defined by reference line 2—2 of FIG. 1.
Figure 3:
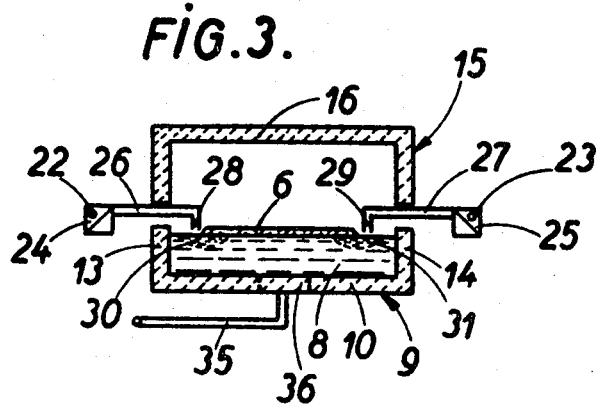
FIG. 3 is a transverse cross-sectional view taken substantially along reference line 3—3 of FIG. 2.

With more particular reference to the drawings, in the apparatus illustrated in FIGS. 1 to 3, a glass tank furnace 1 is shown only by its side walls 2 and 3 which channel molten glass 4 and guide it between the casting rollers 5. On leaving the rollers 5, the glass ribbon 6 is supported on an inclined table 7 before reaching a bath 8 of molten metal held in a tank 9 formed by a tank bottom 10, an upstream end wall 11, a downstream end wall 12, and side walls 13 and 14. Disposed above the bath 8 of molten metal is a roof structure 15 comprising a top 16, an upstream end wall 17, and a downstream end wall 18.

Two reservoirs 19 and 20 (shown diagrammatically in FIG. 2) are disposed one on each side of the tank 9 and both contain a surface tension reducing agent 21 for lowering the surface tension of the molten metal. The two reservoirs 19 and 20 supply two flow regulators 24 and 25 of known type via pipes 22 and 23. The flow regulators 24 and 25 regulate the rate of feed of the said surface tension reducing agent to the bath of molten metal. The agent flows from the flow regulators 24 and 25 into the tank 9 via two molybdenum pipes 26 and 27. The pipes 26 and 27 extend through side walls 13 and 14 respectively of the tank 9, near to the end walls 11 and 17, and the discharge ends 28 and 29 of the pipes 26 and 27 are located at a small distance above the surface of the molten metal at points 30 and 31 adjacent the side walls 13 and 14. The surface tension reducing agent discharging from pipes 26 and 27 chemically combines with some of the molten metal to form a compound which dissolves in the metal and is carried along towards the other end of the tank. During such movement, the dissolved substance becomes distributed over two marginal zones represented by the broken lines 32 and 33 in FIG. 2, which zones underlie the side edges of the floating glass layer. The dissolved substance does not become distributed through the lower levels of the bath but remains in the surface region thereof.

Molten metal is continuously withdrawn from the tank near the downstream end walls 12 and 18 and this withdrawn metal is purified and recycled to the tank. In order to bring the recycled metal to the correct temperature before it reenters the tank, it is piped through heat exchangers 34 which are made of molybdenum and which are immersed in the bath 8 of molten metal. These heat exchangers are connected at the one end to a conduit 35, leading to a delivery opening 36 in the bottom 10 of the tank 9, and at the other end to a delivery conduit 37 of a pump 38. The pump 38 has an intake pipe 39 connected to a purifying device 40, and it draws molten metal through this purifying device from the tank 9 via conduits 41 and 42. The inlets 43 and 44 of these conduits are located in the side walls 13 and 14 respectively of the tank 9 just below the surface of the bath 8 of molten metal.

Adjacent the downstream end wall 12, the sheet glass 45 is lifted out of the bath 8 of molten metal and then dispatched by rollers 46 towards an annealing lehr (not shown).

The above-described embodiment of the apparatus of this invention operates as follows:

The tank 9 is kept filled with molten metal (molten tin) and the reservoirs 19 and 20 are filled with a mixture of nitrogen and a small quantity of hydrogen also containing a surface tension reducing agent, such as sulphur, in the vapor state. The flow regulators 24 and 25 allow suitably metered quantities of the gaseous mixtures to flow continuously through the molybdenum pipes 26 and 27 to the points 30 and 31 above the glass feed end of the bath. The gas mixture leaving the pipes 26 and 27 at these points passes into the inert atmosphere of nitrogen and hydrogen above the surface of the bath of molten metal, and the sulphur reacts with the molten tin to form tin sulphide, which dissolves in the molten metal and becomes distributed by the forward surface current along the marginal zones indicated by the broken lines 32 and 33. The dissolved compound lowers the surface tension of the bath in these surface regions. These regions underlie the side edges of the floating layer of glass, and the wetting angle of the ribbon of glass 6 diminishes until it reaches an equilibrium value less than which would obtain in the absence of the dissolve compound. Consequently, the final thickness of the glass ribbon 6 is less than it would be in the absence of the dissolved compound. The formed sheet glass in then cooled due to the usual temperature gradient along the bath so that by the time the downstream end of the tank is reached, the glass can be raised from the bath and brought to the transporting rollers 46.

The quantities of molten metal continuously leaving the surface region of the bath at its downstream end through the withdrawal pipes 41 and 42 include the quantities of dissolved tin sulphide reaching that end of the tank, since such dissolved compound is retained in the surface zones 32 and 33, and the said withdrawn quantities of molten metal also include slag by which the surface zones are contaminated. These withdrawn quantities of metal are purified in the purifying device 40 by a hydrogen treatment, and the reconditioned metal is recirculated to the tank 9 via heat exchangers 34 by the delivery pump 38.

In practice, examination of the surface of glass leaving the annealing lehr (not shown) associated with the illustrated apparatus, has shown that the surface of the glass is not affected in any way by the presence of the tin sulphide in the molten metal bath.

Figure 6:
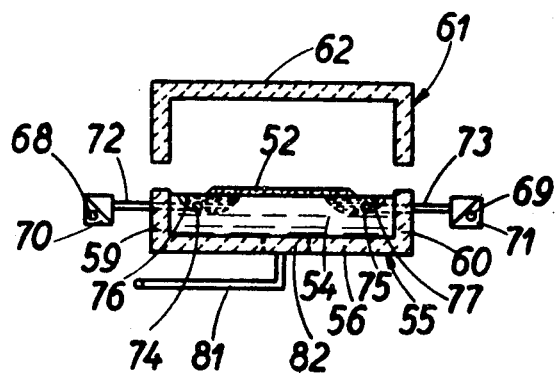
FIG. 6 is a transverse cross-sectional view taken substantially along reference line 6—6 of FIG. 5.

FIGS. 4, 5, and 6 illustrate another embodiment of the apparatus according to the invention. A furnace 47 for melting the glass is only represented by the lateral walls 48 and 49 which channel the molten glass bath 50 in order to lead it between the laminating rollers 51. At the output of these rollers 51, the glass ribbon 52 is supported by an inclined table 53 before being deposited on a molten metal bath 54 contained in a tank 55 constituted by a base 56, an upstream end wall 57, a downstream end wall 58, and side walls 59 and 60. Above the molten metal bath 54 there is disposed a roof structure 61 comprising a top 62, an upstream end wall 63, and a downstream end wall 64.

In this embodiment, two reservoirs 65 and 66 represented schematically in FIG. 5 are disposed at respective opposite sides of the tank 55 and contain the element 67 for reducing the surface tension of the metal bath. These two reservoirs 65 and 66 feed, via the tubings 68 and 69, two flow regulators 70 and 71 of a known type. In this example, the flow regulators 70 and 71 serve as elements for regulating the concentration of the surface tension reducing agent applied to the molten metal. Leading from flow regulators 70 and 71 are two molybdenum tubes 72 and 73 which are utilized to introduce the surface tension reducing agent into the molten metal bath. Tubes 72 and 73 pass through the side walls 59 and 60, respectively, of tank 55 and are disposed in such a manner that their ends 74 and 75 empty in the vicinity of the upstream end wall 57 at a small distance below the surface of the molten metal bath 54 at locations 76 and 77 near side walls 59 and 60, respectively. Beginning from locations 76 and 77, there are formed two low surface tension zones 78 and 79 constituted by components having weak intermolecular linkages. Zones 78 and 79 have a limited width and flow respectively along the side walls 59 and 60 as far as the vicinity of the downstream end wall 58 while being maintained in the upper region of the molten metal bath 54.

In order to assure the thermal conditioning of the metal bath, this embodiment of the invention also contains an assembly of heat exchangers 80 having a tubular form and connected in series. The assembly of heat exchangers 80, made of molybdenum, is immersed in the molten metal bath 54 contained in the tank 55 and is connected at one end to a conduit 81 whose other end is attached to an opening 82 arranged in the base 56 of the tank 55. The other end of the assembly 80 is connected to the delivery conduit 83 of a pump 84 shown schematically. Pump 84 has an inlet tubing 85 which is connected to a purifier 86 as shown schematically. Purifier 86 is fed by a conduit 87 which is coupled to a branch conduit 88. These two conduits are connected to outlets 89 and 90 disposed in side walls 59 and 60, respectively, near the upper surface of the molten metal bath 54.

Near the downstream end wall 58, the glass sheet 91 is raised out of the molten metal bath 54 and is then delivered by rollers 92 toward an annealing tunnel which is not shown in FIGS. 4 and 5.

This second embodiment of the apparatus of this invention functions in the following manner, which is similar in many respects to the operation of the first embodiment of the apparatus of this invention.

For placing this second embodiment into operation, pure molten metal is placed in the tank 55; the reservoirs 65 and 66 are filled with a mixture of nitrogen, a small quantity of hydrogen, and a surface tension reducing element 67 in the vapor state; then, a portion of the gaseous mixture is emitted into the flow regulators 70 and 71. Suitably metered quantities of the gaseous mixture leave the regulators and are carried by molybdenum tubes 72 and 73 toward the outlets 76 and 77. There, the nitrogen and hydrogen rise to the surface of the pure metal bath, while the surface tension reducing element reacts with the molten metal to form a compound having weak intermolecular linkages. Such a compound, soluble in molten metal, tends to migrate toward the surface of the molten metal bath to form low surface tension zones 78 and 79 which flow along the side walls 59 and 60, respectively. When the zones 78 and 79 are thus formed, the wetting angle of the glass ribbon 52 diminishes and the glass reaches an equilibrium thickness significantly lower than that obtained when the glass is spread out on pure molten metal.

Then, the glass sheet having a reduced thickness is cooled so that it can be raised out of the bath at the downstream end of the tank by transporting rollers 92.

In order to recirculate pure molten metal through the opening 82 in base 56, the molten metal picked up at inlets 89 and 90 is delivered into a purifying device 86, where a hydrogen treatment permits pure metal to be recovered at the output of the purifying device and placed back into circulation in the tank 55 by the action of pump 84.

Reference is now made to FIGS. 7 and 8 which show a third embodiment of the apparatus according to the invention. This embodiment is linked to a glass melting tank furnace 93 of which only the downstream end of the molten glass discharge channel 94, formed by a base 95 and side walls 96, 97 is shown. The molten glass 98 flows via a flow regulating barrier 99 onto a bath 100 of molten metal in a tank 101. The tank 101 is bounded by the tank bottom 102, an upstream end wall 103, a downstream end wall 104, and side walls 105 and 106. The tank has a roof structure 107 comprising a top 108, an upstream wall 109, a downstream end wall 110, and two side walls. Disposed between the roof structure 107 and the regulating barrier 99 is a chamber 111 comprising a ceiling 112 and two side walls, one of which appears in FIG. 7 and is marked 113.

Molten metal is continuously withdrawn from the tank near its downstream end wall 104, and this withdrawn metal is purified and recycled to the tank. In order to bring the recycled metal to the correct temperature before it re-enters the tank, it is driven through a number of series-connected heat exchangers 115 located in the space above the molten metal bath. This series of heat exchangers, which are simple tubular chambers made of molybdenum, is connected on one end to a conduit 116 leading to a delivery opening 117 in the bottom 102 of the tank 101, and on the other end to a delivery conduit 118 of a pump 119. The pump 119 has an intake pipe 120 connected to a purifying device 121 and draws molten metal through this purifying device from the tank 101 via conduits 130 and 131. The inlets 132 and 133 of these conduits are located in the side walls 105 and 106, respectively, of the tank 101, just below the surface of the bath 100 of molten metal.

Adjacent the downstream end wall 104, the sheet of glass 134 is lifted out of the bath 100 of molten metal and conveyed by the rollers 135 to an annealing lehr (not shown).

The apparatus according to FIGS. 7 and 8 chiefly differs from that shown in FIGS. 1 to 3 in that the surface tension reducing agent 21 is fed into the stream of purified molten metal recycling to the bath. To this end, branch conduits 122 and 125 extend to the intake side of pump 119 from a reservoir 124 containing the said agent 123. The flow of the agent from the reservoir is controlled by a valve 126 which is automatically regulated by a proportion regulator 127 in dependence on impulses supplied by two flow meters 128 and 129 disposed in conduits 122 and 120 respectively. In this way, the concentration of the dissolved substance in the molten metal flowing back to the tank can be kept constant.

This apparatus according to FIGS. 7 and 8 can be operated as follows:

The surface tension reducing agent in reservoir 124 is in liquid form under an atmosphere of nitrogen and a small quantity of hydrogen. The metered flow of the agent entering the conduit 120 at the intake side of pump 119 becomes rapidly mixed in the molten metal. When the stream of molten metal containing the dissolved substance, after having been preheated in the heat exchangers substantially to the temperature of the molten metal at the glass feed end of the bath, enters this bath, it rises and is caught up in the forward surface current in the bath, and forms the upper strata 136 of molten metal flowing forwardly to the end of the tank from which the flat glass and molten metal are withdrawn. In fact, in this embodiment, the dissolved substance is distributed over the whole width of the tank at the surface region of the bath.

Due to the presence of the dissolved substance in the surface layers of molten metal, the wetting angle of the glass on the bath is less than it would otherwise be and, in consequence, as the molten glass spreads out on the bath and advances along the tank, the thickness of the glass layer progressively diminishes until it reaches an equilibrium value less than the equilibrium value which would obtain in the absence of the surface tension reducing agent.

As in the use of apparatus according to FIGS. 1 to 3, the performance of the invention as described with reference to FIGS. 7 and 8 does not in any way affect the surface of the sheet glass.

The following data show the effects of different quantities of two particular surface tension reducing agents, i.e., sulphur and tellurium, when using a bath of molten tin. The significance of these data will be appreciated when it is borne in mind that the molten glass forms a wetting angle of 84° on pure molten tin and that this corresponds with an equilibrium thickness of the glass of 5.8 mm.

| | Wetting angle, degree | Thickness of the glass, mm. |
|---|---|---|
| Amount of sulphur, percent: | | |
| 0.006 | 60 | 4.5 |
| 0.1 | 20 | 1.5 |
| Amount of tellurium, percent: | | |
| 0.05 | 64 | 4.5 |
| 0.5 | 32 | 2.1 |

While specific reference has been made to the use of sulphur and molten tin in the operation of an illustrated embodiment of apparatus according to the invention, it will be clear that the various forms of apparatus which have been described and illustrated can be used with a variety of different substances alternative to those particular substances.

It will be understood that the above description of the present invention is susceptible to various modifications, changes, and adaptations, and the same are intended to be comprehended within the meaning and range of equivalents of the appended claims.

We claim:

1. A method for treating a layer of molten glass on a bath of molten metal at a temperature at which the glass tends towards a particular equilibrium thickness, comprising the steps of: dissolving into at least part of the bath which is in contact with the edges of the glass layer small quantities of a material selected from the group consisting of sulphur and tellurium which reduces the wetting angle of the glass on the bath; and maintaining the glass layer on the bath for a sufficient time to permit the layer to attain a thickness which is less than such particular equilibrium thickness.

2. A method as defined in claim 1 wherein said step of maintaining the glass layer is carried out for a sufficient length of time to permit the layer to attain the equilibrium thickness corresponding to the surface tension of the bath in the regions containing the material.

3. A method as defined in claim 1 wherein said step of dissolving is carried out by continuously adding such material to the bath.

4. A method as defined in claim 1 wherein said step of dissolving is carried out by introducing the material at the surface of the bath.

5. A method as defined in claim 1 wherein said step of dissolving is carried out by introducing such material into a part of the bath whose temperature is equal to that at which the glass tends toward the particular equilibrium thickness.

6. A method as defined in claim 5 wherein the glass is maintained in constant movement along the length of the bath and said step dissolving is carried out by introducing the material into at least one region which is at an upstream location with respect to the movement of the glass.

7. A method as defined in claim 1 comprising the further steps of removing the molten metal of the bath from one point thereof, returning it to another point thereof, and introducing the material into the molten bath metal which is being returned to the bath.

8. A method as defined in claim 1 comprising the further steps of removing molten bath metal containing the material from one point of the bath, reducing the material concentration of the metal removed from the bath, and returning the remaining metal to a different point in the bath.

9. In apparatus for treating a layer of molten glass on a bath of molten metal at a temperature at which the glass tends towards a particular equilibirium thickness, which apparatus includes a tank for holding a bath of molten metal; means for feeding molten glass onto the surface of such bath; and means for maintaining the molten glass on at least one portion of such bath at such temperature, the improvement comprising means for supplying at least one portion of the bath surface with a material selected from the group consisting of sulphur and tellurium whose presence in small quantities lowers the wetting angle of the glass on the bath so as to cause the glass to attain a thickness which is less than such particular equilibrium thickness.

10. An arrangement as defined in claim 9 wherein said means for supplying the material are arranged to supply such material in a continuous manner.

11. An arrangement as defined in claim 9 further comprising means for withdrawing molten bath metal and for recycling the withdrawn metal to the bath, and wherein said means for supplying material are connected for supplying such material to the bath metal which is being recycled.

12. An arrangement as defined in claim 9 wherein said means for supplying a material are associated with said tank for delivering such material to at least one bath region to be occupied by the edges of the molten glass.

13. An arrangement as defined in claim 9 further comprising means for extracting material from the molten metal of the bath.

14. An arrangement as defined in claim 9 further comprising means for controlling the quantity of material supplied to the bath.

References Cited
UNITED STATES PATENTS

| 3,317,299 | 5/1967 | Bré    | 65—99 X |
| 3,337,323 | 8/1967 | Loukes | 65—99 X |
| 3,323,890 | 6/1967 | Javaux | 65—99   |
| 3,438,761 | 4/1969 | Eloy   | 65—99   |

S. LEON BASHORE, Primary Examiner

E. R. FREEDMAN, Assistant Examiner

U.S. Cl. X.R.

65—65, 91, 182